I. DIMOCK.
SCREW AND BOLT LOCK.
APPLICATION FILED MAR. 17, 1913.
1,090,908.
Patented Mar. 24, 1914.
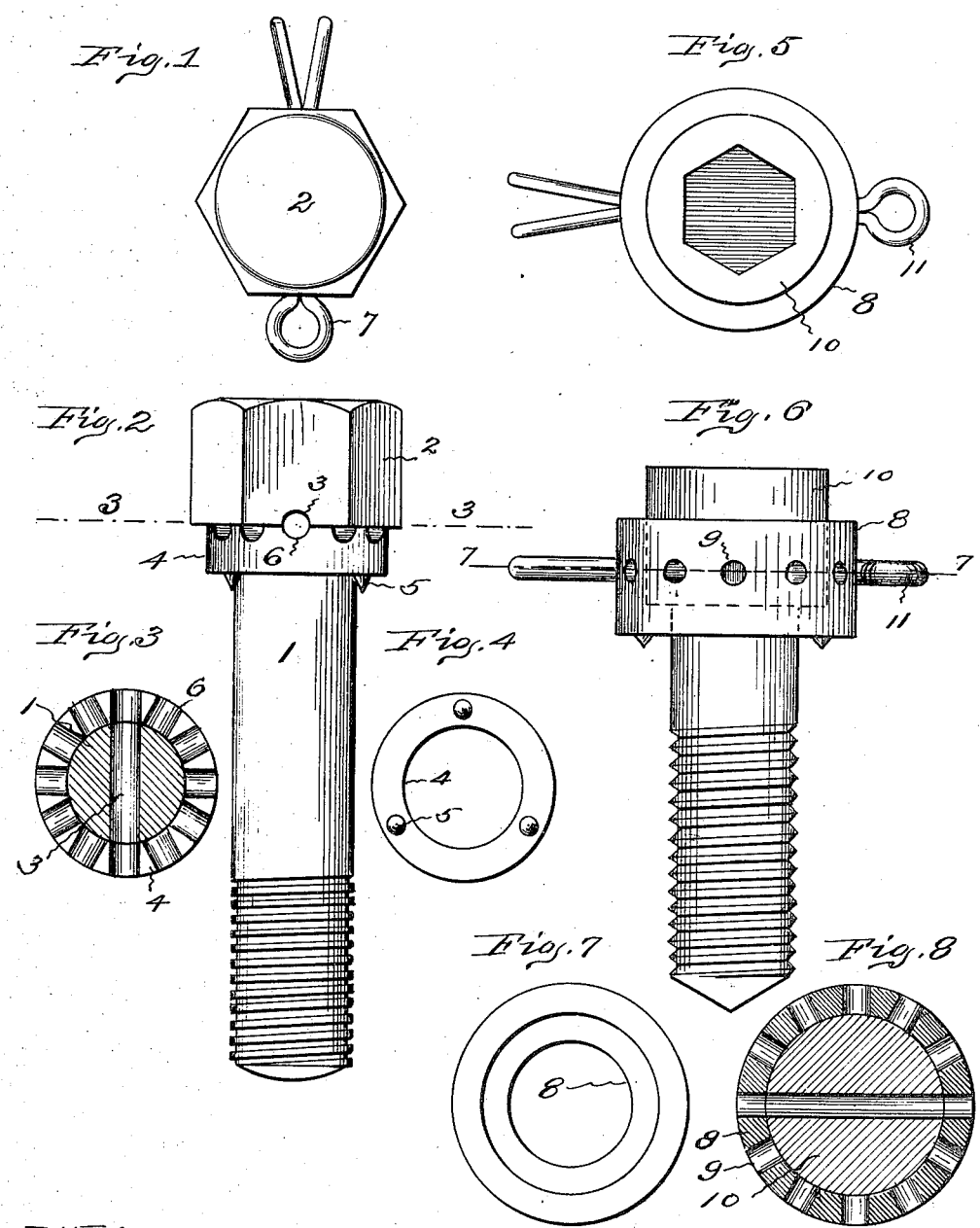

UNITED STATES PATENT OFFICE.

IRA DIMOCK, OF WEST HARTFORD, CONNECTICUT.

SCREW AND BOLT LOCK.

1,090,908.

Specification of Letters Patent.

Patented Mar. 24, 1914.

Application filed March 17, 1913. Serial No. 754,909.

*To all whom it may concern:*

Be it known that I, IRA DIMOCK, a citizen of the United States, residing at West Hartford, in the county of Hartford and State of Connecticut, have invented a new and useful Improvement in Screw and Bolt Locks, of which the following is a specification.

This invention relates to a means which is devised for the purpose of holding bolts or screws from turning loose after they have been set up. This means may be used for locking either bolts or screws of any of the common forms which are set into or employed for holding together metal parts, or wooden parts, or parts of both metal and wood. For the sake of conciseness, throughout the specification the term "screw" is employed as meaning either a bolt or screw, and is intended to include both.

The object of the invention is to provide a very simple and efficient means which is so constructed that without materially weakening a screw it permits the screw to be adjusted or set to just the right degree of tightness to effect the desired result and then locked to prevent it from loosening. In accomplishing this object a single small hole is made diametrically through the head of the screw, and slipped upon the stem beneath the head and always bearing the same relation longitudinally thereto is a washer or cup with a plural number of radial recesses, grooves or perforations which are designed to register with the opening through the head of the screw, so that no matter how tight the screw is turned in there will be some openings in the washer or cup which will aline with the opening that extends through the screw, and thereby provide a passage through both for the insertion of a locking pin. The washer or cup is intended to be engaged with the part into which the screw is seated and held from turning so that when the pin is thrust through the parts the screw cannot turn and yet when the pin is removed the screw can be turned as usual.

Figure 1 of the accompanying drawings shows a top view of a bolt headed screw which is arranged to be held from turning by a means which embodies this invention. Fig. 2 shows a side view of the same with the locking pin omitted. Fig. 3 is a section on the plane indicated by the dotted line 3—3 on Fig. 2. Fig. 4 shows a bottom view of the anchoring washer seen in Fig. 2. Fig. 5 shows a top view of a socketed cap screw that is provided with a modified embodiment of this invention to keep it from turning. Fig. 6 shows a side view of the cap screw and locking means. Fig. 7 shows a top view of the anchoring cup that is shown in Fig. 6. Fig. 8 shows a section through the head of the screw and anchoring cup on the plane indicated by the dotted line 7—7 on Fig. 6.

The contour of the head of the screw is immaterial to the invention, it may be hexagonal as shown in Fig. 1, or cylindrical as shown in Fig. 5. The screw 1 first illustrated has a common form of hexagonal head 2 with a single round perforation 3 that is desirably made diametrically through the screw at the lower edge of the head. Beneath the head on the stem of the screw is a washer 4. This washer on its lower side is provided with means, such as teeth 5, which may project into sockets in the face of the member into which the screw is set so as to prevent the washer from turning. In the upper edge of the washer are a number of radial grooves 6. These grooves are arranged so that in various positions of the head of the screw relative to the washer two of the grooves will register with the perforation through the screw. After the screw has been set as tightly as desired, a pin, such as the cotter-pin 7, is thrust through the perforation in the screw, and as a part of the pin will lie in certain of the grooves in the anchoring washer that can not rotate, the screw will be held from turning. As there is no longitudinal movement, only a relative rotary slip, between the underside of the head of the screw and the upper grooved face of the anchoring washer, but a single opening is made through the screw, which opening need not be a slot, and consequently does not materially weaken the bolt. As the pin will closely fit the hole through the screw it will be tightly held. Owing to the fact that the distance between the under side of the head of the screw and the outer face of the part into which the screw passes, is always the same, and that there is no relative longitudinal movement between the washer and the screw head, the hole through the bolt may be round, and as there is no particular strain, simply a locking action, this hole may be very small.

Instead of having a thin washer with notches in its upper edge between the head of the screw and the surface of the part into which the screw is set, the anchoring member may be made in the form of a cylindrical cup 8 as illustrated in Fig. 6. In this case perforations 9 may be made through the side wall of the cup, which receives the cylindrical head 10 of the screw. There is but a single diametrical perforation through the screw head in this form and practically in almost every position to which the screw head is turned as the screw is set into a part, the hole through the head will register with some of the perforations in the side wall of the cap so as to permit a cotter-pin 11 to be thrust through both parts for preventing the screw from turning.

This invention is particularly adapted for preventing the turning loose of cap screws, lag screws and bolts which are employed for holding together parts of automobiles, and the frames of machines which are subject to considerable vibration. In such cases, owing to the continued vibration, the screws very frequently loosen and as a result of becoming loose their holding strength is impaired so that if they do not work completely out they are likely to become broken and cause accident. The use of the simple means which embodies the invention described and claimed herein will positively prevent any such loosening of bolts and screws and eliminate all possibility of accident.

The invention claimed is:

1. The combination of a screw having a diametrical perforation adjacent to its head, an anchor member loosely surrounding the screw adjacent to the inner side of the head and having a plural number of radial openings adapted to register with the perforation through the screw, there being relative rotation but no relative longitudinal movement between the screw and anchor member when in position for use, and a pin adapted to be thrust through the openings in the anchor member that register with the perforation through the screw for the purpose of locking said parts against relative rotation.

2. The combination of a screw having a diametrical perforation adjacent to its head, a washer with an opening that loosely fits the stem of the screw adjacent to the head and having radial grooves in its outer face and teeth projecting from its inner face, and a pin adapted to be thrust through the registering radial grooves in the washer and perforation through the screw to lock the screw against turning.

IRA DIMOCK.

Witnesses:
E. C. McAllister,
C. W. Richter.